United States Patent
McColl et al.

(10) Patent No.: US 9,389,936 B2
(45) Date of Patent: Jul. 12, 2016

(54) MONITORING THE RESPONSIVENESS OF A USER INTERFACE

(75) Inventors: Cameron McColl, Woodinville, WA (US); Philip Price, Seattle, WA (US); Bertan Aygun, Issaquah, WA (US); Shibani Basava, Redmond, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 808 days.

(21) Appl. No.: 13/241,249

(22) Filed: Sep. 23, 2011

(65) Prior Publication Data

US 2013/0080502 A1    Mar. 28, 2013

(51) Int. Cl.
G06F 13/00 (2006.01)
G06F 11/07 (2006.01)
G06F 9/48 (2006.01)

(52) U.S. Cl.
CPC ............ *G06F 11/0715* (2013.01); *G06F 9/485* (2013.01); *G06F 11/0757* (2013.01); *G06F 11/0778* (2013.01)

(58) Field of Classification Search
CPC ............ G06F 11/3636; G06F 11/3648; G06F 11/3664; G06F 11/3672; G06F 11/3414; G06F 9/485; G06F 11/0715; G06F 11/0757; G06F 11/0778; G06Q 30/02; H04L 29/08072; H04L 29/06; H04L 29/0809; H04L 29/06047
USPC .............................. 709/203; 714/38.12; 718/1
See application file for complete search history.

(56) References Cited

U.S. PATENT DOCUMENTS

| | | | |
|---|---|---|---|
| 5,341,497 A | 8/1994 | Younger | |
| 5,485,574 A | 1/1996 | Bolosky et al. | |
| 5,590,277 A | 12/1996 | Fuchs et al. | |
| 5,978,939 A | 11/1999 | Mizoguchi et al. | |
| 6,332,212 B1 | 12/2001 | Organ et al. | |
| 6,801,940 B1 | 10/2004 | Moran et al. | |
| 7,072,800 B1 | 7/2006 | Fernandez et al. | |
| 7,383,470 B2 | 6/2008 | Canning et al. | |
| 7,469,362 B2 | 12/2008 | Hudson et al. | |
| 7,526,682 B1 | 4/2009 | Chacko et al. | |
| 7,526,757 B2 | 4/2009 | Levine et al. | |
| 7,685,575 B1 | 3/2010 | Fareed | |
| 2005/0120273 A1* | 6/2005 | Hudson et al. | 714/38 |
| 2007/0101324 A1* | 5/2007 | Lupu et al. | 718/1 |
| 2010/0318852 A1 | 12/2010 | Zheng et al. | |

OTHER PUBLICATIONS

"How to View what ASP.NET Requests are doing at runtime on IIS 6.0", Retrieved at <<http://blogs.msdn.com/b/webtopics/archive/2009/05/05/how-to-view-what-asp-net-requests-are-doing-at-runtime-on-iis-6-0.aspx>>, May 5, 2009, pp. 3.

(Continued)

*Primary Examiner* — Robert B Harrell
(74) *Attorney, Agent, or Firm* — Kevin Sullivan; Kate Drakos; Micky Minhas (57) ABSTRACT

A diagnostic mechanism monitors execution of a user interface (UI) thread to detect execution of a long running task that may have caused the UI thread to become unresponsive. The execution time of the UI thread is monitored and when it exceeds a threshold, the UI thread's call stack is preserved to a mini-dump file. The completion time of the UI thread is also tracked and stored in a delay file. The mini-dump and delay files are then uploaded to a server where the collected data is aggregated overall execution runs by multiple users to identify the cause of the unresponsiveness.

20 Claims, 5 Drawing Sheets

(56) References Cited

OTHER PUBLICATIONS

"Database Disconnect Issues with SharePoint", Retrieved at <<http://blogs.msdn.com/b/toddca/archive/2008/03/23/database-disconnect-issues-with-sharepoint.aspx>>, Mar. 28, 2008, pp. 5.

"Performance Testing Microsoft .NET Web Applications", Retrieved at <<http://slava.parma.ru/Docs/Unsorted/New/BOOKS/Performance Testing Microsoft .NET Web Applications.pdf>>, 2003, pp. 284.

* cited by examiner

FIG. 6

MONITORING THE RESPONSIVENESS OF A USER INTERFACE

BACKGROUND

A software application may be configured to utilize independent threads of execution in order to offload the processing of certain functions from the main process. A user interface (UI) thread may be used to create windows and to manage the exchange of messages and user input communicated through the windows. For example, the UI thread may manage user-interface objects, such a dialog boxes, and user activities, such as resizing windows, and so forth.

The slow response time of the UI thread in processing the user's input affects the usefulness of the software application. At times, it may be difficult to identify the bottlenecks contributing to the slow response time or unresponsiveness of the UI thread. Each user's execution environment differs which makes reproducing or detecting a bottleneck difficult. Often users may employ different network connections or may utilize other programs that interact with the hardware and resources on the user's machine. In addition, the user interfaces may utilize graphical user interface objects in a variety of ways that may not have been foreseen or tested. Accordingly, the responsiveness of the UI thread is a key factor that affects the user's experience with the software application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An application may contain a UI thread to process user interactions with the application. The UI thread may be implemented as a message pump that retrieves user events, represented in the form of messages, from a message queue. The UI thread calls an event handler associated to process the message. The UI thread waits for the message to finish processing before retrieving another message from the message queue.

A diagnostic mechanism monitors the UI thread to determine when the UI thread becomes unresponsive. The unresponsive behavior may be determined when the UI thread fails to retrieve a message from the message queue within a predetermined time. When the diagnostic mechanism determines that the UI thread has become unresponsive, the UI thread is suspended in order to preserve the call stack to a mini-dump file. The UI thread resumes and when the message completes processing, the delay time of the event as well as other data is then recorded in a delay file. The mini-dump and delay files are then uploaded to a server for further analysis.

In one or more embodiments, the diagnostic mechanism may be implemented as a diagnostic module having a monitoring component and a monitoring thread. The monitoring component and monitoring thread are configured to execute in the same process as the UI thread. At runtime, the monitoring component detours certain functions used by the UI thread to the monitoring component so that the monitoring component may track the time the UI thread spends processing a message. The monitoring thread uses a timer to determine when the UI thread becomes unresponsive. Once the monitoring thread determines that the UI thread has meet the threshold time for unresponsiveness, the call stack of the UI thread is preserved.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments are directed to a mechanism for monitoring the unresponsiveness of a user interface. A UI thread may be used by an application to manage the application's user interface. User interface events are represented as messages that are stored in a message queue until processed by the UI thread. The UI thread may be implemented as a message pump or loop that retrieves messages from a message queue and processes them accordingly. The goal of the UI thread is to continually retrieve messages from the message queue which is otherwise known in the art as pumping messages. In this manner, the events triggering the messages are responded to quickly thereby improving the performance and responsiveness of the UI thread.

When the UI thread takes an inordinate amount of time to process a message, the UI thread is considered unresponsive. The condition that caused the UI thread to become unresponsive may be a long running task that caused the UI thread to hang. In order to improve the responsiveness of the UI thread, it is paramount to know what conditions delayed the UI thread.

Figure 1:
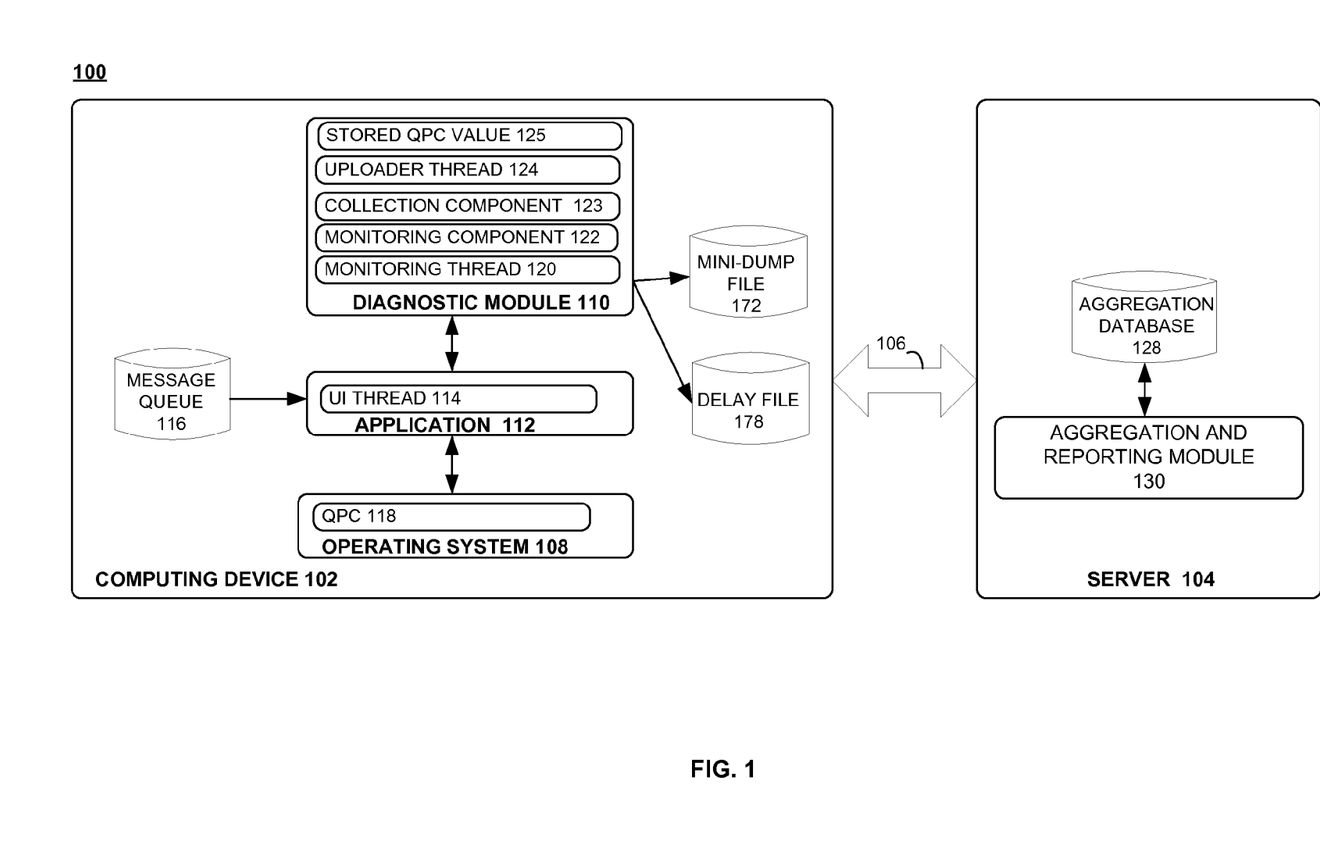
FIG. 1 illustrates an exemplary system for monitoring the unresponsiveness of a user interface.

FIG. 1 illustrates a block diagram of an exemplary system for monitoring user interface unresponsiveness. The system 100 may include a computing device 102 and a server 104 communicatively coupled through a network 106. The computing device 102 and the server 104 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof. The network 106 may be any type of communications link capable of facilitating communications between the computing device 102 and the server 104, utilizing any communications protocol and in any configuration, such as without limitation, a wired network, wireless network, or combination thereof. It will be appreciated that the network connections shown are exemplary and other means of establishing a communications link between the computing device 102 and the server 104 may be used as well.

In one or more embodiments, the computing device 102 may be utilized by a user. The computing device 102 may include an operating system 108, a diagnostic module 110, and one or more applications 112. The application 112 and the diagnostic module 110 may be a sequence of computer program instructions, that when executed by a processor, causes the processor to perform methods and/or operations in accordance with a prescribed task. The application 112 and the diagnostic module 110 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

A process is an instance of an application that is configured with the resources needed to execute it. A process may contain one or more threads. A thread is an independent execution unit that executes a subset of the application's instructions or code. A component is a software package that contains instructions and data configured to execute as an independent unit. The application 112 may include a UI thread 114 that executes concurrently with other threads. The UI thread 114 may be used to create windows and to manage the exchange of messages and user input exchanged through the windows.

In an embodiment, the UI thread 114 may be implemented as a message pump. A message pump retrieves messages from a message queue 116 which are then forwarded to a corresponding event handler for processing. A sequence of messages may be translated or aggregated into an event. For example, the mouse button down message and the move message may be aggregated into a window resize event. Examples of other events may include keyboard input, time expiration, and so forth. The UI thread 114 calls the event handler associated with a message and waits for the completion of the execution of the event handler before retrieving another message.

Messages may be placed into the message queue 116 by the operating system 108. Retrieving a message from the message queue 116 may be referred to as pumping a message and the mechanism for retrieving messages from the message queue 116 and forwarding them for processing is otherwise known as the message pump. The goal of the UI thread 114 is to continually retrieve messages from the message queue 116 or to continually pump messages. In this manner, the events triggering the messages are responded to quickly thereby improving the performance and responsiveness of the UI thread 114. When the UI thread 114 takes an inordinate amount of time to process a message, the UI thread 114 is considered unresponsive. In order to improve the responsiveness of the UI thread, it is important to know the source of the problem.

The operating system 108 manages and coordinates the resources needed to execute the application 112 and other programs. The operating system 108 may include a Query Performance Counter (QPC) 118 which is a high-precision timer that may be used to determine the length of time that a process or thread within an application 112 takes to execute. The time units may be milliseconds, seconds, etc. The QPC 118 may be implemented as a kernel function that may be accessible by an application through an application programming interface (API). Alternatively, the QPC 118 may be implemented as a software procedure external of the operating system 108.

A diagnostic module 110 may be a software application that monitors the responsiveness of the UI thread 114. The responsiveness of an application 112 may be measured by the amount of time the UI thread 114 takes to execute a task. If the UI thread 114 takes an inordinate amount of time to execute a task, then the UI thread 114 is considered to be unresponsive. A threshold may be used to determine when the UI thread 114 is deemed unresponsive. The threshold may be a particular amount of time such as 2000 milliseconds or 2 seconds, or any other defined value.

The diagnostic module 110 may be composed of a monitoring thread 120, a monitoring component 122, a collection component 123, an uploader thread 124, and a stored QPC value 125. The monitoring thread 120 monitors the UI thread 114 to determine when the UI thread 114 is unresponsive. At that time, the collection component 123 captures the UI thread's call stack which is stored in a mini-dump file 172. When the UI thread 114 completes processing the message that caused the unresponsiveness behavior, the collection component 123 collects the delay time and other anonymous data that may be stored in a delay file 178. The uploader thread 124 may be used to upload the data to the server 104. The stored QPC value 125, when set to a non-zero value, retains the time at which the UI thread started processing the current message, and when set to zero, indicates that the previous message has finished processing.

In one or more embodiments, the application 112 may be Microsoft's Visual Studio® product which may be used by a user to develop console and graphical user interface applications. The UI thread 114 may be the Visual Studio® UI thread and the diagnostic module 110 may be PerfWatson extension to Visual Studio®. However, the embodiments are not limited to these particular software programs.

A server 104 may be utilized to aggregate the data from the mini-dump file 172 and the delay file 178 from various users of the application 112. The server 104 may include an aggregation database 128 and an aggregation and reporting module 130. The aggregation database 128 stores the data in the mini-dump files 172 and the delay files 178 from the various executed runs of the application 112 by multiple users across various computing platforms. The aggregation and reporting module 130 may be used to analyze the aggregated data and to formulate reports displaying the analysis. The analysis may be used to determine the conditions attributing to the delay of the UI thread 114. By aggregating the data across multiple users of an application, the source of the problem may be recognized quickly.

Although the system 100 shown in FIG. 1 has a limited number of elements in a certain configuration, it should be appreciated that the system 100 can include more or less elements in alternate configurations. For example, the server 104 may be arranged as a plurality of server machines or configured as a combination of server and client machines. The diagnostic module 110 may be part of the application 112 and not a separate program as shown in FIG. 1. There may also be several aggregation and reporting modules 130 that may operate concurrently on one or more servers 104. The embodiments are not limited in this manner.

In various embodiments, the system 100 described herein may comprise a computer-implemented system having multiple elements, programs, procedures, modules. As used herein, these terms are intended to refer to a computer-related entity, comprising either hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. By way of illustration, both an application running on a server and the server may be an element. One or more elements may reside within a process and/or thread of execution, and an element may be localized on one computer and/or distributed between two or more computers as desired for a given implementation. The embodiments are not limited in this manner.

The various elements of system 100 may be communicatively coupled via various types of communications medium as indicated by various lines or arrows. The elements may coordinate operations between each other. The coordination may involve the uni-directional or bi-directional exchange of information. For instance, the elements may communicate information in the form of signals communicated over the communications medium. The information may be implemented as signals allocated to various signal lines. In such allocations, each message is a signal. Further embodiments, however, may alternatively employ data messages. Such data messages may be sent various connections. Exemplary connections include parallel interfaces, serial interfaces, and bus interfaces.

Figure 2:
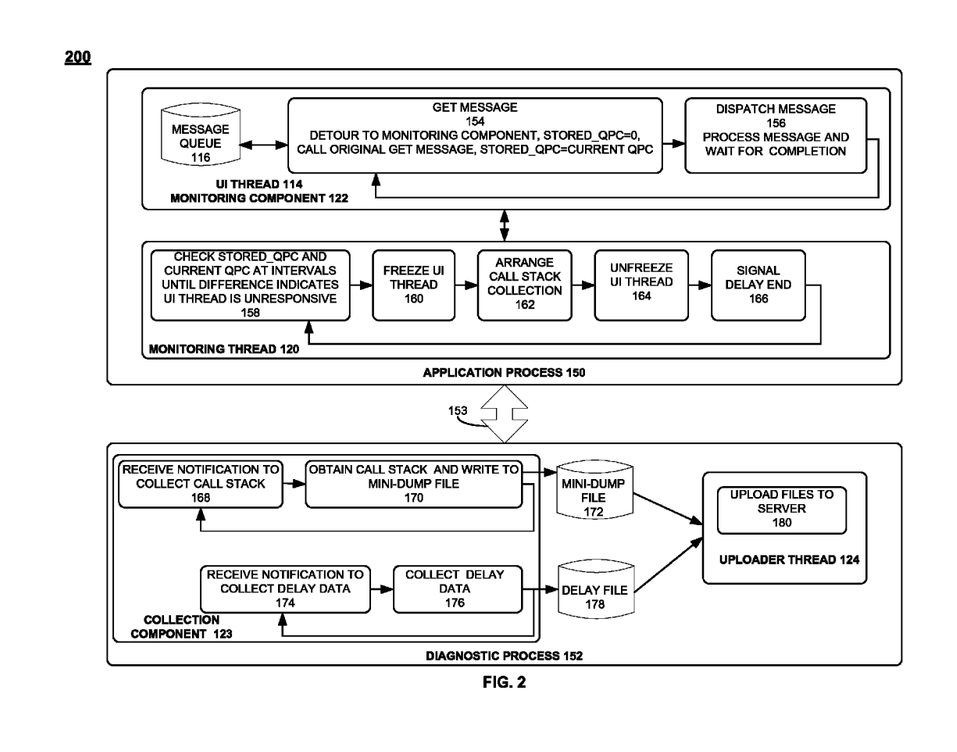
FIG. 2 illustrates exemplary elements of a system used to monitor for the unresponsiveness of a user interface.

FIG. 2 illustrates the elements of the system 200 in further detail. Initially, the application 112 and the diagnostic module 110 may be installed in the computing device 102. In one or more embodiments, the monitoring thread 120 and the monitoring component 122 execute in the same process as the UI thread 114, shown as the application process 150. When the monitoring component 122 executes, the monitoring component 122 spawns or generates the monitoring thread 120. The collection component 123 and the uploader thread 124 may execute in a diagnostic process 152 that is separate from the application process 150.

The application 112 may have a mechanism for extending the functions provided by an application 112 by allowing other executable code to be executed as part of the application 112. For example, the application 112 may have an installer program that allows an application 112 to load in additional code so that the entire combination would execute in the same process. When the application 112 is loaded for execution, the installer program may load the monitoring component 122 into the same process as the application 112.

The application process 150 and the diagnostic process 152 execute in separate address spaces and communicate with each other through an inter-process communication (IPC) mechanism 153. In one or more embodiments, the application process 150 and the diagnostic process 152 may communicate through any one of the Windows-supported IPC mechanisms, such as pipes, clipboard, file mapping, mail slots, sockets, remote procedure calls, and so forth. In an embodiment, the application process 150 and diagnostic process 152 may use pipes to communicate and transfer data. A pipe is an area of memory shared by the application process 150 and the diagnostic process 152 so that each process is able to read and write data stored in the shared memory.

The application 112 executes within the application process 150 and may spawn off the UI thread 114 as a separate and independent execution path to manage the application's windows. The UI thread 114 runs within the application process 150 and shares the same address space. This allows the UI thread 114 and the application 112 to share the same data structures.

The UI thread 114 executes a message pump whereby the UI thread 114 obtains messages from the message queue 116 and calls functions to process the messages continuously. The UI thread calls a GetMessage function 154 to retrieve a message from the message queue 116 and then calls a Dispatch Message function 156 to execute the event handler associated with the message. However, the GetMessage function 154 is detoured to the monitoring component 122. The monitoring component 122 may set and reset a stored value of the QPC which may be used to track the processing time of the UI thread in processing a message.

A detour is a technique that enables interception of a source function call so that a detour function is executed in place of the source function. At runtime, when the UI thread 114 calls the GetMessage function 154 to retrieve a message off the message queue 116, control jumps to the detour function instead. In the present case, the detour function is the monitoring component 122. The monitoring component 122 initializes a stored QPC value 125 to zero and transfers control to the original GetMessage function. When the original GetMessage function completes processing, the control flows back to the monitoring component which stores the current QPC value as the stored QPC value 125 (i.e., stored_QPC=current QPC value). The monitoring thread 120, at predefined intervals, makes a comparison of the stored QPC value 125 and the current QPC value to determine if the UI thread 114 exceeds a threshold indicative of unresponsiveness. For example, the comparison may be made every 300 ms and a timer may be used to activate the monitoring thread 120 every 300 ms to make the comparison.

The detour may be facilitated by a technique referred to as API hooking. In API hooking, a detour API is provided that enables a program, such as the monitoring component 122, to change the address of a source function call with the address of the detour function or monitoring component 122. At runtime when the UI thread 114 calls the GetMessage function to retrieve a message from the message queue 116, the monitoring component 122 is called first.

Once the message is retrieved and the stored QPC value 125 set, the UI thread 114 calls the DispatchMessage function which calls the event handler corresponding to the message (block 156). The UI thread 114 waits until the event handler completes processing (block 156) and then returns to the GetMessage function (block 154) to get the next message off the message queue 116.

Simultaneously, the monitoring thread 120 polls for the current QPC value repeatedly at predetermined intervals (block 158). The monitoring thread 120 compares the stored QPC value 125 with the current QPC value to determine the amount of time that has lapsed since the UI thread has started processing a message. The monitoring thread 120 determines if the difference between the stored QPC 125 value and the current QPC value meets and/or exceeds a threshold that deems the UI thread unresponsive (block 158). The threshold may be a predetermined value that is set by a developer or alternatively, the threshold may be a user-configurable input.

When the monitoring thread 120 determines that the UI thread 114 has become unresponsive, the monitoring thread 120 freezes or suspends execution of the UI thread 114 (block 160) and notifies the collection component 123 to collect the call stack (block 162). The call stack is saved at the point in time after the threshold has been met. The call stack contains a list of the calls made by the UI thread 114 at the point the UI thread 114 is suspended. The call stack is preserved into the min-dump file 172 for use in identifying the condition causing the UI thread's unresponsiveness.

Next, the monitoring thread 120 unfreezes the UI thread 114 and allows the UI thread 114 to finish executing the message to completion (block 164). When the message completes processing, the UI thread 114 loops back to GetMessage 154 to get another message from the message queue 116. When the monitoring thread 120 detects that the stored QPC value 125 is zero, then the monitoring thread 120 recognizes that the previous message has completed processing (block 166). At this point, the monitoring thread 120 signals a delay end to the collection component 123 (block 166).

The collection component 123 executes when it receives notifications or messages from the monitoring thread 120. The monitoring thread 120 may send the collection component 123 a message indicating that the call stack is to be collected (block 162). Upon receiving such a notification (block 168), the collection component 123 obtains the call stack which it copies to a mini-dump file 172 (block 170).

An operating system may contain methods that may be used to create a dump file containing system information, such as a call stack. For example, in some Windows-based operating systems, the Windows® IDebugClient provides methods for use in opening and writing system-level data into a dump file. In an embodiment, the collection component 123 may preserve the call stack by calling one of the methods provided by Windows® IDebugClient to open and write to the mini-dump file 172 with the UI thread's call stack.

Additionally, the collection component 123 may receive a notification or message from the monitoring thread 120 to collect the delay data (block 174). The delay data may include anonymous data pertaining to the application and the duration of the unresponsive condition. The delay data may be collected and stored in a delay file 178 (block 176).

For example, the collected data may contain the following data and may be formatted into an XML-based file as follows:

```
<?xml version="1.0" encoding = "utf-8"?>
<ResponsivenessDelayInfo>
    <Duration> 3539 </Duration>
    <UserName> External </UserName>
    <ComputerName> External </Computer Name>
    <ServerProc> devenv </ServerProc>
    <VsVersion> 10.0.40219.1 builtby:SP1Rel </VsVersion>
    <Timestamp>2011-06-15T08:29:17</Timestamp>
    <SessionId>ed5f81b8-86b8-40ff-88b0-9e8f457233b8</SessionId>
</ResponsivenessDelayInfo>
```

The Duration tag indicates the total amount of time that the UI thread 114 was unresponsive. The UserName tag indicates whether the application run was internal to the developer of the application or external. The ComputerName tag indicates whether the application run was executed on a computer that is internal to the developer of the application or external. The ServerProc tag indicates the name of the application. The VsVersion tag indicates the version of the application being monitored, the Timestamp tag indicates the day and time that the unresponsiveness occurred, and the SessionId tag specifies a session identifier associated with the execution of the application.

The delay file 178 may then be stored in the computing device 102 and at a later point in time uploaded to a server 104 (block 180) by the uploader thread 124. The uploader thread 124 may be initiated by the collection component 123 to upload all the mini-dump files 172 and delay files 178 on the computing device 102 to the server 104 at a designated point in time.

Operations for the embodiments may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 3:
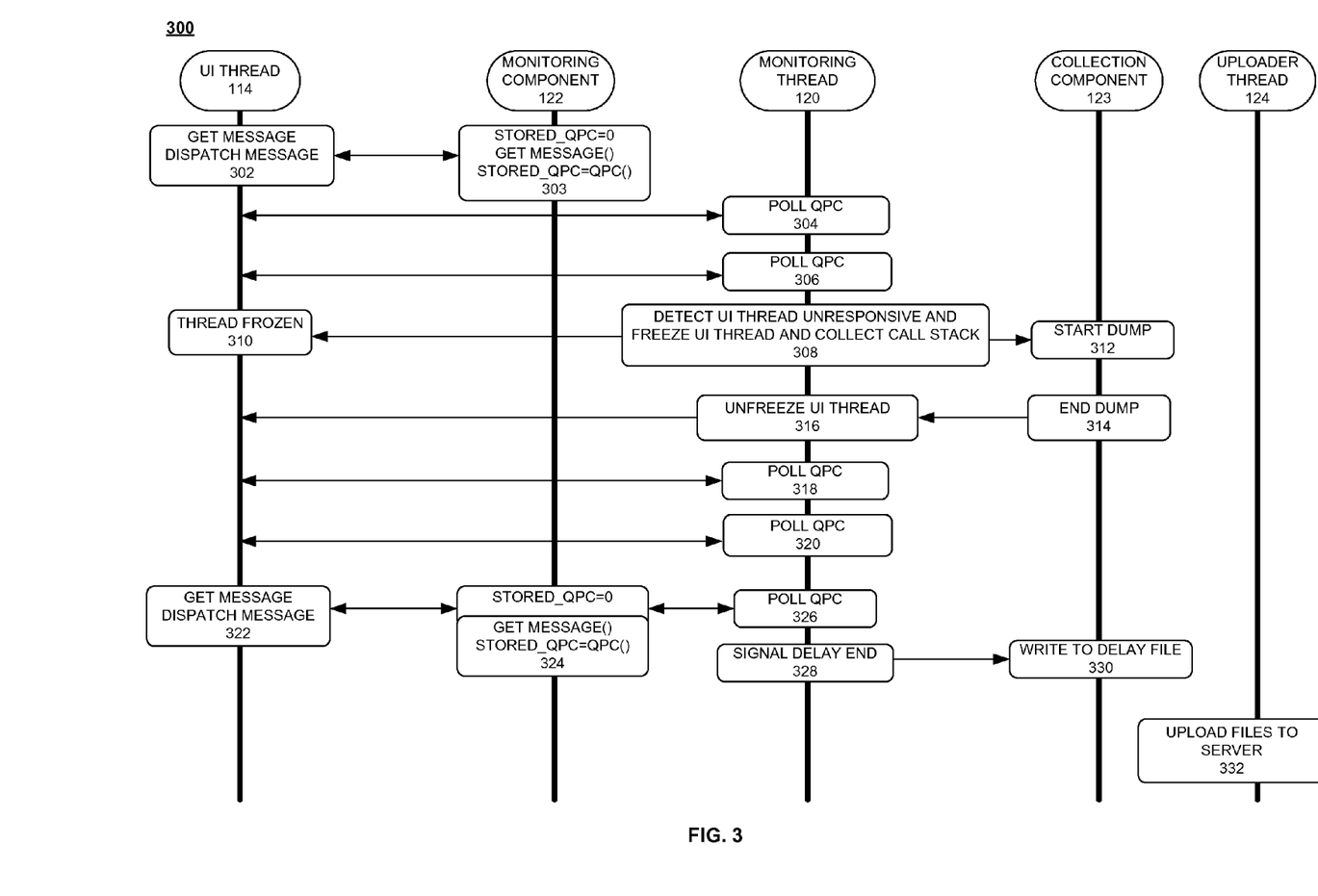
FIG. 3 is a flow diagram illustrating an exemplary method for monitoring for the unresponsiveness of a user interface.

FIG. 3 illustrates a flow diagram of an exemplary method for monitoring the user interface responsiveness. It should be noted that the method 300 may be representative of some or all of the operations executed by one or more embodiments described herein and that the method can include more or less operations than that which is described in FIG. 3. In an embodiment, the method may illustrate operations for systems 100 and 200.

The UI thread 114, the monitoring component 122, the monitoring thread 120, the collection component 123, and the uploader thread 124 execute simultaneously. The UI thread 114 executes a message pump or message loop that gets messages from a message queue 116 (block 302). The UI thread 114 is detoured to the monitoring component 122 when the UI thread 114 calls the GetMessage function. The monitoring component 122 resets the stored QPC 125 value to zero and calls the original GetMessage function which retrieves a message from the message queue 116 (block 303). When the GetMessage function completes processing, control returns back to the monitoring component 122. The monitoring component 122 then sets the stored QPC value to the current QPC value and calls the DispatchMessage function. The DispatchMessage function calls the event handler associated with the message (block 302).

The monitoring thread 120 continuously at predetermined intervals (blocks 304, 306), such as 300 ms, compares the current value of the QPC with the stored QPC value 125 until the difference meets or exceeds a threshold (block 308). At this point, the monitoring thread 120 freezes the UI thread (blocks 308, 310) and notifies the collection component 123 to collect the current call stack (block 308).

The collection component 123 engages the operating system 108 to preserve or copy the call stack into the mini-dump file 172 (block 312) and notifies the monitoring thread 120 when the dump or collection is completed (block 314). The monitoring thread 120, in response to the end dump notification, unfreezes or resumes the UI thread 114 (block 316). The monitoring thread 120, at predetermined intervals, continues to compare the current value of the QPC with the stored QPC value 125 (blocks 318, 320). The UI thread 114 resumes processing to completion and calls the GetMessage function to retrieve another message from the message queue 116 (block 322). When the GetMessage function is detoured to the monitoring component 122, the stored QPC value 125 is reset to zero (block 324). The monitoring thread 120, at the predetermined interval, detects that the stored QPC value is zero thereby indicating that the previous message has completed processing (block 326). The monitoring thread 120 then signals the end of the delay to the collection component 123 (block 328).

The collection component 123 in turn writes out the delay data to the delay file 178 (block 330). The uploader thread 124 uploads the mini-dump file 172 and the delay file 178 at a later point in time (block 332). The monitoring thread 120 continues to poll the current QPC, the UI thread 114 continues processing messages from the message queue 116, and the collection component 123 waits for notifications from the monitoring thread 120 to collect the data.

Figure 4:
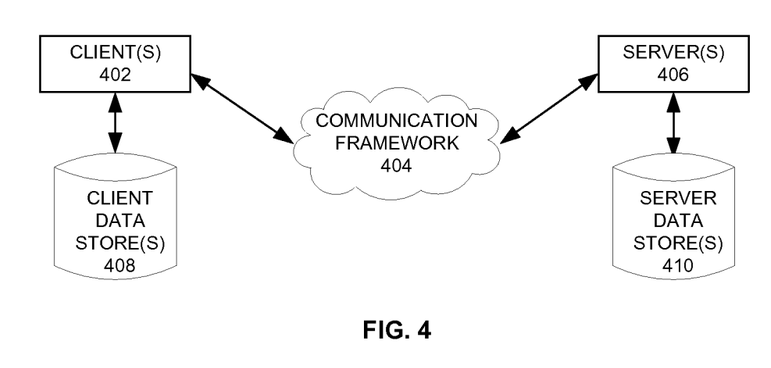
FIG. 4 is a block diagram illustrating an operating environment.

Referring now to FIG. 4, there is shown a schematic block diagram of an exemplary operating environment 400. The operating environment 400 may include one or more client(s)

402 in communication through a communications framework 404 with one or more server(s) 406. The client(s) 402 may implement the client systems, such as the computing device 102 and the server(s) 406 may implement the server(s) 104.

A client 402 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A client 402 may also be embodied as a software module having instructions that execute in a single execution path, multiple concurrent execution paths (e.g., thread, process, etc.), or in any other manner A server 406 may be embodied as a hardware device, a software module, or as a combination thereof. Examples of such hardware devices may include, but are not limited to, a computer (e.g., server, personal computer, laptop, etc.), a cell phone, a personal digital assistant, or any type of computing device, and the like. A server 406 may also be embodied as a software module having instructions that execute in a single execution path, multiple concurrent execution paths (e.g., thread, process, etc.), or in any other manner.

The communications framework 404 facilitates communications between the client 402 and the server 406. The communications framework 404 may embody any type of communications medium, such as wired or wireless networks, utilizing any communication protocol. Each client(s) 402 may be coupled to one or more client data store(s) 408 that store information local to the client 402. Each server(s) 406 may be coupled to one or more server data store(s) 410 that store information local to the server 406.

Figure 5:
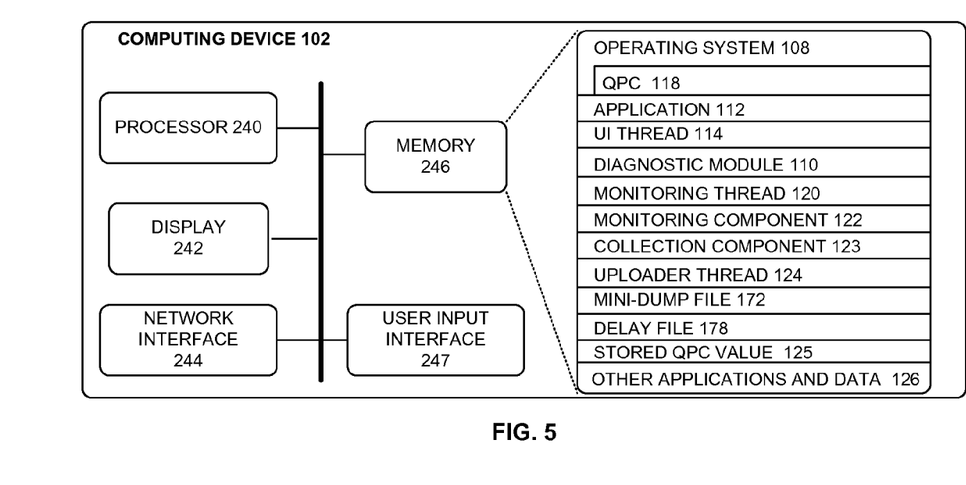
FIG. 5 is a block diagram illustrating an exemplary computing device.

FIG. 5 illustrates a block diagram of an exemplary computing device 102. The computing device 102 may have a processor 240, a display 242, a network interface 244, a memory 246, and a user input interface 247. The processor 240 may be any commercially available processor and may include dual microprocessors and multi-processor architectures. The display 242 may be any visual display unit. The network interface 244 facilitates wired or wireless communications between the computing device 120 and a communications framework. The user input interface 247 facilitates communications between the computing device 120 and input devices, such as a keyboard, mouse, etc.

The memory 246 may be any computer-readable storage media that may store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 246 may also include one or more external storage devices or remotely located storage devices. The memory may 246 contain instructions and data as follows:

an operating system 108;
a QPC 118;
an application 112;
a UI thread 114;
a diagnostic module 110;
a monitoring thread 120;
a monitoring component 122;
a collection component 123;
an uploader thread 124;
a mini-dump file 172;
a delay file 178;
a stored QPC value 125; and
various other applications and data 126.

Figure 6:
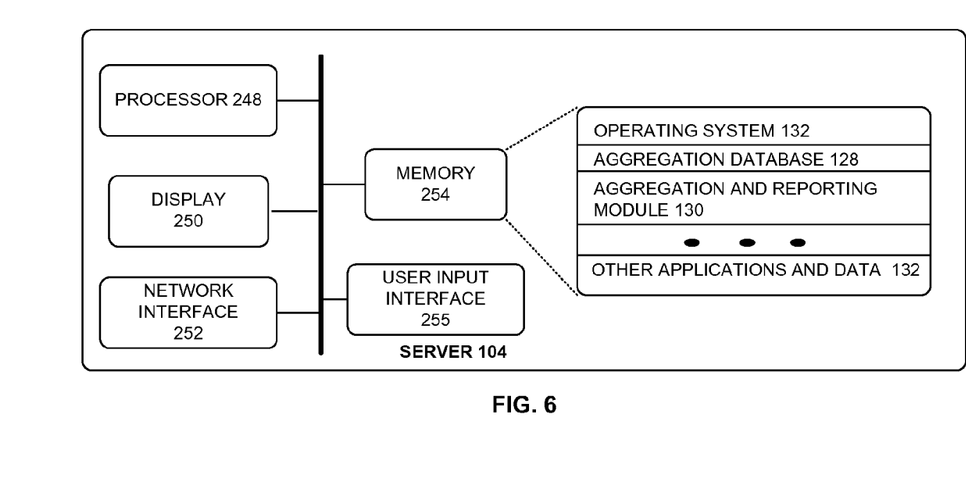
FIG. 6 is a block diagram illustrating an exemplary server.

FIG. 6 illustrates a block diagram of an exemplary server 104. The server 104 may have a processor 248, a display 250, a network interface 252, a memory 254, and a user input interface 255. The processor 248 may be any commercially available processor and may include dual microprocessors and multi-processor architectures. The display 250 may be any visual display unit. The network interface 252 facilitates wired or wireless communications between the computing device 120 and a communications framework. The user input interface 255 facilitates communications between the computing device 120 and input devices, such as a keyboard, mouse, etc.

The memory 254 may be any computer-readable storage media that can store executable procedures, applications, and data. The computer-readable media does not pertain to propagated signals, such as modulated data signals transmitted through a carrier wave. It may be any type of memory device (e.g., random access memory, read-only memory, etc.), magnetic storage, volatile storage, non-volatile storage, optical storage, DVD, CD, floppy disk drive, and the like. The memory 254 may also include one or more external storage devices or remotely located storage devices. The memory 254 may contain instructions and data such as one or more of the following:

an operating system 132;
an aggregation database 128;
an aggregation and reporting module 130; and
other applications and data 132.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Various embodiments may be implemented using hardware elements, software elements, or a combination of both. Examples of hardware elements may include devices, components, processors, microprocessors, circuits, circuit elements, integrated circuits, application specific integrated circuits, programmable logic devices, digital signal processors, field programmable gate arrays, memory units, logic gates and so forth. Examples of software elements may include software components, programs, applications, computer programs, application programs, system programs, machine programs, operating system software, middleware, firmware, software modules, routines, subroutines, functions, methods, procedures, software interfaces, application program interfaces, instruction sets, computing code, code segments, and any combination thereof. Determining whether an embodiment is implemented using hardware elements and/or software elements may vary in accordance with any number of factors, such as desired computational rate, power levels, bandwidth, computing time, load balance, memory resources, data bus speeds and other design or performance constraints, as desired for a given implementation.

Some embodiments may comprise a storage medium to store instructions or logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as programs, procedures, module, applications, code segments, program stacks, middleware, firmware, methods, routines, and so on. In an embodiment, for example, a computer-readable storage medium may store executable computer program instructions that, when executed by a processor, cause the processor to perform methods and/or operations in accordance with the described embodiments. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

What is claimed:

1. A method for monitoring the responsiveness of a user interface, comprising:
  monitoring execution of a user interface (UI) thread processing an event from when the UI thread initiates execution of a message associated with the event to completion of an event handler that is associated with the event;
  determining that the UI thread is unresponsive when an amount of time the UI thread takes to process the event exceeds a threshold;
  suspending execution of the UI thread;
  during the suspended execution of the UI thread, preserving a call stack associated with the UI thread when the UI thread is determined to be unresponsive; and
  resuming execution of the UI thread once the call stack is preserved,
  wherein the preceding steps are performed on at least one processor.

2. The method of claim 1, further comprising:
  aggregating a plurality of call stacks and a plurality of delay times associated with unresponsiveness of the UI thread.

3. The computer implemented method of claim 2, further comprising:
  transmitting the aggregated plurality of call stacks and aggregated plurality of delays times to a remote server.

4. The method of claim 1, wherein monitoring execution of the UI thread is performed by a monitoring thread executing concurrently in a same process as the UI thread.

5. The method of claim 1, the determining step further comprising:
  resetting a stored time value prior to the UI thread initiating execution of the event; and
  polling a current timer until the current timer meets the threshold.

6. The method of claim 1, wherein the event is represented in the form of at least one message, wherein the threshold represents a predetermined amount of time the UI thread is expected to retrieve a message from a message queue.

7. The method of claim 1, wherein an operating system inserts the message into a message queue upon detection of a user input and wherein the UI thread initiates processing of the event when the UI thread pulls the message off the message queue.

8. A device, comprising:
  at least one processor and a memory;
  the at least one processor configured to:
    monitor execution of a user interface (UI) thread processing an event from when the UI thread initiates execution of a message associated with the event to completion of an event handler that is associated with the event;
    determine that the UI thread is unresponsive when an amount of time the UI thread takes to process the event exceeds a threshold;
    suspend execution of the UI thread;
    during the suspended execution of the UI thread, preserve a call stack associated with the UI thread when the UI thread is determined to be unresponsive; and
    resume execution of the UI thread once the call stack is preserved.

9. The device of claim 8, wherein the at least one processor is further configured to:
  aggregate a plurality of call stacks and a plurality of delay times associated with unresponsiveness of the UI thread.

10. The device of claim 9, wherein the at least one processor is further configured to:
  transmit the aggregated plurality of call stacks and aggregated plurality of delay times to a remote server.

11. The device of claim 8, wherein monitor execution of the UI thread is performed by a monitoring thread executing concurrently in a same process as the UI thread.

12. The device of claim 8, wherein the at least one processor is further configured to:
  reset a stored time value prior to the UI thread initiating execution of the event; and
  poll a current timer until the current timer meets the threshold.

13. The device of claim 8, wherein the event is represented in the form of at least one message, wherein the threshold represents a predetermined amount of time the UI thread is expected to retrieve a message from a message queue.

14. The device of claim 8, wherein an operating system inserts the message into a message queue upon detection of a user input and wherein the UI thread initiates processing of the event when the UI thread pulls the message off the message queue.

15. A system, comprising:
  at least one processor and a memory;
  the at least one processor configured to:
    monitor execution of a user interface (UI) thread processing an event from when the UI thread initiates execution of a message associated with the event to completion of an event handler that is associated with the event;
    determine that the UI thread is unresponsive when an amount of time the UI thread takes to process the event exceeds a threshold;
    suspend execution of the UI thread;
    during the suspended execution of the UI thread, preserve a call stack associated with the UI thread when the UI thread is determined to be unresponsive; and
    resume execution of the UI thread once the call stack is preserved.

16. The system of claim 15, wherein monitor execution of the UI thread is performed by a monitoring thread executing concurrently in a same process as the UI thread.

17. The system of claim 15, wherein the at least one processor is further configured to:
  aggregate a plurality of call stacks and a plurality of delay times associated with unresponsiveness of the UI thread.

18. The system of claim 15, wherein the at least one processor is further configured to:
  reset a stored time value prior to the UI thread initiating execution of the event; and
  poll a current timer until the current timer meets the threshold.

19. The system of claim 15, wherein the event is represented in the form of at least one message, wherein the threshold represents a predetermined amount of time the UI thread is expected to retrieve a message from a message queue.

20. The system of claim 15, wherein an operating system inserts the message into a message queue upon detection of a user input and wherein the UI thread initiates processing of the event when the UI thread pulls the message off the message queue.

* * * * *